Figure 1:
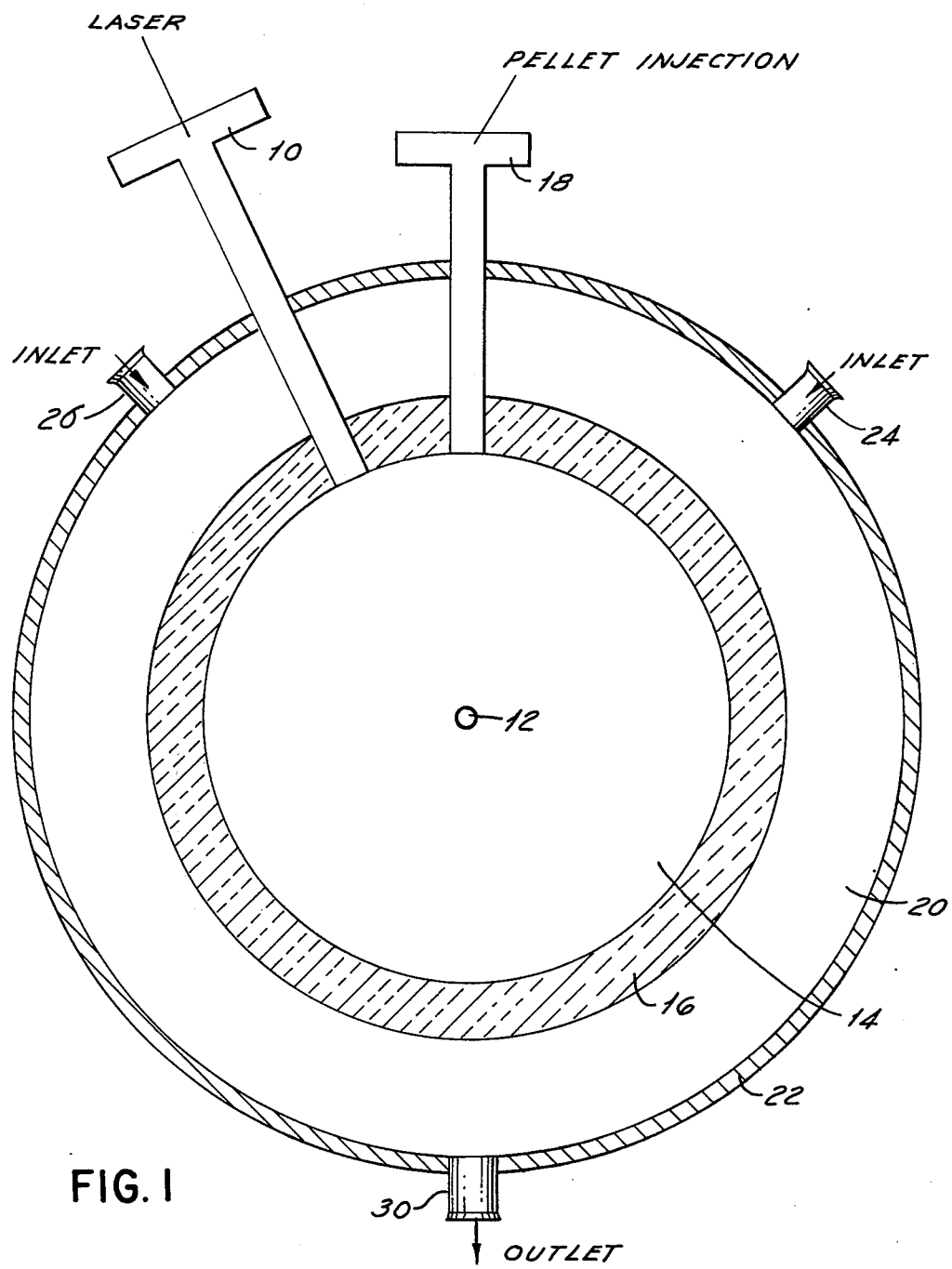

United States Patent [19]

Gomberg et al.

[11] 4,121,984
[45] Oct. 24, 1978

[54] PRODUCTION OF HYDROGEN BY RADIOLYSIS

[75] Inventors: Henry J. Gomberg; Robert J. Teitel, both of Ann Arbor, Mich.

[73] Assignee: Texas Gas Transmission Corporation, Owensboro, Ky.

[21] Appl. No.: 414,370

[22] Filed: Nov. 9, 1973

[51] Int. Cl.² .......................... B01J 1/10; G21G 1/00
[52] U.S. Cl. .............................. 204/157.1 H; 176/16
[58] Field of Search ............... 204/157.1 H, DIG. 11; 176/9

[56] References Cited
U.S. PATENT DOCUMENTS

| 2,986,510 | 5/1961 | Wigner et al. | 176/17 |
| 3,206,365 | 9/1965 | Guernsey | 176/14 |
| 3,214,359 | 10/1965 | Stout et al. | 204/157.1 H |
| 3,378,446 | 4/1968 | Whittlesey | 176/1 |
| 3,489,645 | 1/1970 | Daiber | 176/1 |

Primary Examiner—Howard S. Williams
Attorney, Agent, or Firm—Laurence R. Brown

[57] ABSTRACT

Water is decomposed into its components (hydrogen and oxygen) by direct radiation from a nuclear reactor. The addition of soluble boron compounds or boron-containing particles to a mist, vapor, steam or spray of water converts the neutrons derived from nuclear fusion reactions into highly ionizing radiation; thus increasing the effectiveness of decomposition and hydrogen gas yield.

13 Claims, 2 Drawing Figures

PROCESS FLOW DIAGRAM

PRODUCTION OF HYDROGEN BY RADIOLYSIS

This invention relates to the Production of Hydrogen by Radiolysis and more particularly to the dissociation of water by subjecting steam, water vapor, water spray or a fine mist to the neutrons emanating from a fusion reaction.

Much work is presently being done on the achievement of ignition and burn of fusion fuel such as, for example, deuterium-tritium in pellet form. While there are a number of different approaches to this problem, one of them includes the utilization of a source of energy from a laser and particular pellet configurations which will make it possible to achieve ignition and burn in a reaction chamber. Patents which illustrate generally the apparatus which can be used in this type of system are:

Whittlesey U.S. Pat. No. 3,378,446 — Apr. 16, 1968
Daiber U.S. Pat. No. 3,489,645 — Jan. 13, 1970

In a copending application of Theodor Teichmann, Ser. No. 414,369, filed Nov. 9, 1973, there is described and illustrated a process and apparatus for the dissociation of steam in producing the components of hydrogen and oxygen and also to minimize radiation damage to the reaction chamber. This process is carried on inside the fusion reaction chamber.

The present invention relates to the use of neutrons penetrating the reaction chamber wall in the range of 14 MEV neutrons originally derived from the deuterium-tritium reactions. These neutrons are very difficult to confine and, accordingly, if the energy thereof can be successfully utilized in a radiolysis process there are distinct advantages to be gained.

It is therefore an object of the present invention to provide an apparatus and a process for utilizing neutrons in decomposing water to obtain hydrogen.

It is a further object to provide a system which will greatly increase the hydrolytic yield by the use of a boron-neutron reaction and the invention contemplates the use of other neutron absorbers such as lithium.

It is a further object to provide a system for the production of hydrogen as a potential fuel material by a relatively inexpensive process as compared with electrolysis or the use of hydrocarbon fuel sources. Another important feature lies in the fact that the present system does not materially interfere with recovery of heat from fusion reactions and the use of the boron-neutron process actually boosts the availability of energy from the D-T fusion reaction by about 12.5%.

Other objects and features of the invention will be apparent in the following description and claims in which the principles of operation and use of the invention are set forth in the best mode presently contemplated for the practice of the invention.

Figure 2:
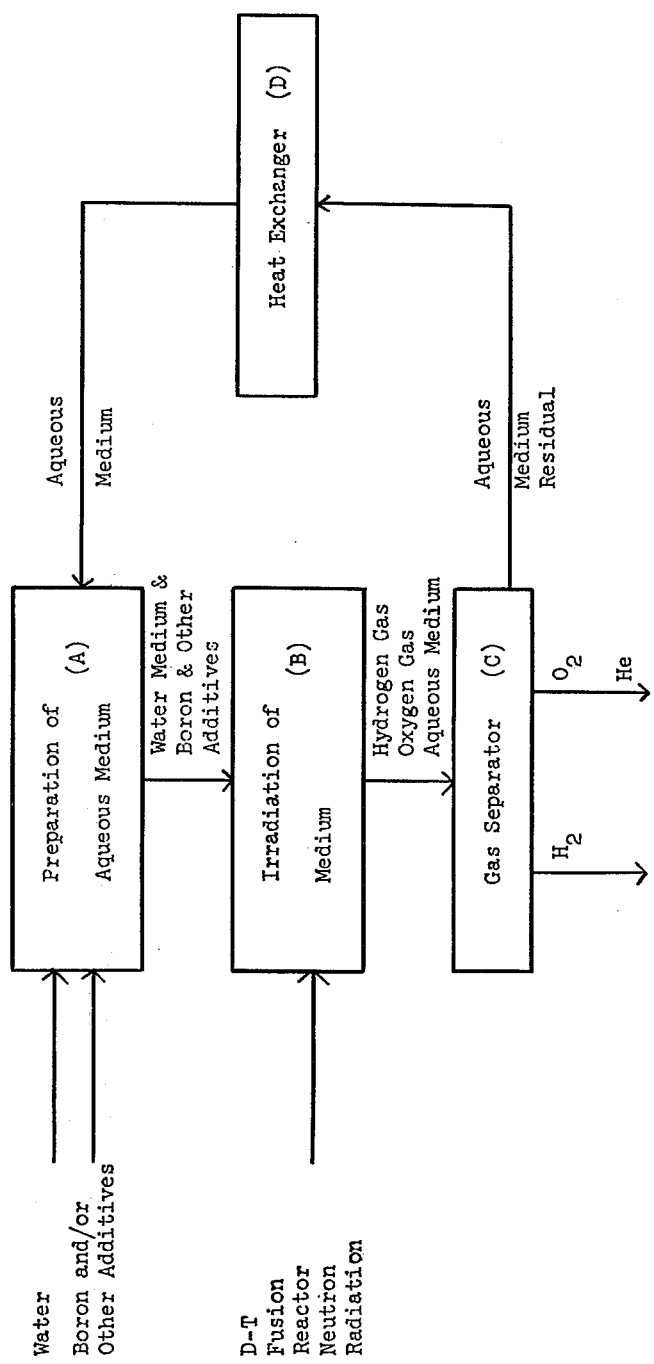

Drawings accompany the disclosure and the various views may be described as:

FIG. 1, a schematic view of an apparatus for accomplishing the invention,

FIG. 2, a process flow diagram.

As indicated above, water in the form of steam vapor, mist or spray is dissociated by radiation made available from a nuclear fusion reactor. A nuclear fusion reactor produces a unique radiation. Up to 80% of the energy of the deuterium-tritium reactions appear as 14 MEV neutron radiation outside the fusion reaction chamber. It is this radiation source and the modifications of the radiation caused by interractions with atoms and molecules that will be employed by the invention process.

The decomposition of water has been studied extensively because water coolants are being employed in fission reactors. References 1, 2, 3 and 4, listed at the end of the specification, are examples of treatise on the subject.

It is contemplated that the present process and apparatus may be used with water in varying conditions such as steam, vapor, mist or spray. In any of these forms boric acid can be used in solution. On the other hand, particulates containing boron can be introduced into the water carrier and this would preferably be of such size that the particles are below the mean free path of the radiation, or at least of such size that over 25% of the radiation resulting from neutron capture escapes the particle.

The present invention process consists of the following principle steps which are illustrated in FIG. 2.
A. Preparation of the Water Medium
B. Irradiation of the Water Medium
C. Separation of Hydrogen
D. Removal of Heat The first step in the process consists of the preparation of water with the proper consistency of additives to insure high hydrogen gas yields. Such an additive will capture neutrons to form a transmutated isotope which emits a high density ionizing radiation to dissociate water more efficiently. Preferably, this isotope should be chosen to leave no long term residual radioactivity. For these reasons and its relative high neutron capture cross-section, boron-10 isotope is a prime additive, which is present in natural boron to the extent of 19.8%. When boron reacts with a neutron, high energy helium-isotope and lithium-7 isotope radiations are produced. Neither of these products are radioactive and their energy is absorbed into the surrounding (in this case, water) locally.

The boron may be introduced into the water medium in a number of forms and compounds as long as they contain the boron nuclei. The reaction may be set out as follows:

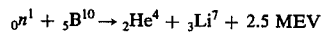

$$_0n^1 + {}_5B^{10} \rightarrow {}_2He^4 + {}_3Li^7 + 2.5 \text{ MEV}$$

The result, it will be seen, is the production of energy and non-radioactive products.

Examples of ways to introduce boron as the additive are as follows. First, when boric acid in solution is used, it has the characteristic of vaporizing when the solution is vaporized or boiled. It has been established that the ratio of boric acid composition in the vapor to that in the liquid is between 0.005 and 0.1 at temperatures between 100° and 320° C. It is also recognized that the pH of the solution affects the distribution between vapor and liquid and can be used as a control.

A second method of adding boron to vapor or steam, should higher concentrations be requried, is to introduce submicron size boron particles to the vaporized water. This will require high velocity vapor and the use of an inert carrier gas that will not interfere with hydrogen gas separation in the Step C of the process. A gas such as helium could be utilized.

When a water spray or mist is used, the boron can be introduced by forming a spray or mist of a boric acid solution. The characteristics of the spray can be regulated by the selection of spray heads as obtained from Spraying Systems Co., of Wheaton, Ill., for example. If the boric acid solution becomes too corrosive, or a higher concentration is desired, a boron particulate can be aspirated into the nozzle and introduced into the water medium.

It will be seen from the above that the preparation step of the water medium gives great flexibility in that a wide range of additive is possible and the density of the medium can be regulated.

In Step B, the water medium dosed with additives, either molecular or fine particle dispersion, is passed through a neutron flux from the fusion chamber of a nuclear fusion reactor. The neutrons are absorbed in the additive (boron or others) and dissociate water to produce hydrogen and oxygen. Neutrons are absorbed in the solution and the kinetic energy of the neutrons converted to heat. The velocity of movement is determined by the limitation of temperature. It is desirable to avoid conditions which will encourage recombination of hydrogen and oxygen. The total thickness of the chamber for Step B is determined by that thickness required to absorb a practical portion of the neutron stream (for example, 95%). The actual thickness can be calculated by well known procedures using the neutron scattering cross-section, the neutron capture cross-section (averaged for the spectrum of neutron energies), the concentration of absorber in the aqueous medium and density of the medium.

Referring still to the Flow Diagram of FIG. 2, in Step C, the hydrogen and oxygen produced by water dissociation is stripped from the aqueous medium by, for example, condensation. Boron particulates that may have been added will be simultaneously removed by a phase separation or carried through in the aqueous medium. The non-condensable gases, $H_2$, $O_2$ and He will be further treated to remove hydrogen. This can be accomplished by diffusion of gases through a solid or porous membrane. For example, hydrogen diffuses readily through many metals such as palladium, iron and niobium, and these can be used for the membrane. Other materials that may be used are alloys including stainless steel, nickel steel alloys, and other steel alloys, and glasses which preferably have a high $SiO_2$, $B_2O_3$ or $P_2O_5$ content; in short, any material that is permeable to hydrogen. These membranes or diffusion walls can be located within the reactor chamber or in an external circuit. Helium gas can be recovered by diffusion through glass barriers external to the reactor, thus leaving oxygen to be recovered for utilization or release to the atmosphere.

Hydrogen and helium are each permeable through silica glasses, for example. Thus, these products can both be recovered by diffusion leaving behind the oxygen. Then a metal wall may be used to separate the hydrogen from the helium since helium does not permeate metals, while hydrogen does. Since metal does not stand up well when exposed to oxygen, it is preferable to utilize glass as a first separator and metal as the second. The separator walls will then have a longer life.

The separated aqueous medium from Step C is returned and recycled through the process and its temperature adjusted in Step D. The amount of heat which must be handled in Step D will depend on the neutron moderation occurring during Step B. The heat generation can be minimized by providing a moderating zone between the fusion chamber and the water medium surrounding the chamber.

The aqueous medium return from Step D is returned to Step A and replenished with necessary water make-up and boron replacement.

A schematic view of an apparatus for performing the process is illustrated in FIG. 1, where a laser source 10 directs pulse to a pellet 12 at the center of a reaction chamber 14 surrounded by a wall 16. A pellet source 18 is shown for introduction of the fusion fuel in any suitable manner. Surrounding the wall is a secondary chamber 20 formed by an outer wall 22 of metal. This outer wall will have two inlets 24 and 26 for the water medium prepared in Step A above described. Even through the firing in the reaction chamber is intermittent the flow through inlets 24 and 26 will be reasonably constant and the outflow will take place through outlet 30 after Step B and proceed to the gas separation step.

For example, the solubility of $H_3BO_3$ in aqueous solution is ~30g per 400g of solution at its boiling point (103.3° C.) (page 221, reference 3). The distribution coefficient at this temperature is ~0.006 (page 226, reference 3) or 0.18g of $H_3BO_3$ per 100g of steam. Additives of Li or K reduce the distribution coefficient and high solution pH also reduce the volatility of boric acid at 1500 psia (page 227, reference 3).

In some instances, it may be desirable to use dispersed particles and the processes for the production of boron from ores are described in reference 6, pages 69-81. An electrolytic process described therein produces finely divided boron. Particles ranging from less than 0.1 micron to 5 microns are shown in the reference and it is believed that the larger particles are agglomerates of smaller particles. Processes for separating boron-10 are also described in reference 6. In the event the water medium deteriorates boron, the particles can be made of any one of a large number of boron compounds.

It will be appreciated that pulverization of the boron-containing particles used to form dispersion is limiting since the size desired is that from which the He atoms can escape the particle. It is known, however, that accumulations of the He atoms in a solid will tend to fragment the solids or render them porous. Therefore, the size of the boron particles will be produced and maintained at the desired level by a neutron irradiation even though some may be initially larger than desirable for most effective use in the process.

The process has been described above in connection with the use of boron, but other nuclei may be used which, upon absorption of a neutron, will disintegrate with a resulting release of energy and leaving non-radioactive products. It is possible also to use lithium as an additive and the reaction in this event will produce a desirable and recoverable radioactive product in the form of tritium. The reaction is:

$$_0n^1 + {_3Li^6} \rightarrow {_2He^4} + {_1H^3} + 4.78 \text{ MEV}$$

As in the case of boron, the lithium can be introduced into the chamber in any form wherein the lithium nuclei is present.

References:
1. Reactor Handbook, Interscience Publishers, 2nd Ed., Vol. 1, Chapters 42 and 52 (1960).
2. C. J. Hochanadel, "Radiation Chemistry of Water," Comparative Effects of Radiation, John Wiley, Chapter 8 (1960).
3. Paul Cohen, Water Coolant Technology of Power Reactors, Gordon and Breach Science Publishers (1969).

4. V. S. Hofman, "Radiolysis of Water Vapor by Alpha Radiation," Radiochemica Acta, Vol. 1, No. 4, p. 201 (1963).
5. M. Steinburg, "Chemonuclear and Radiation Chemical Process Research and Development," U.S. Atomic Energy Commission, Brookhaven National Laboratory Report BNL 10020 (1966).
6. C. A. Hampel, "Rare Metals Handbook," R. E. Krieger Publishing Co., Inc. (1971).

What we claim is:

1. A process for producing hydrogen by exposure of a water medium to neutrons which comprises:
   1. providing a water medium for exposure to neutron radiation,
   2. incorporating in said water medium an additive having a nuclei which, upon absorption of a neutron, will disintegrate releasing energy,
   3. exposing said medium and incorporated additive to neutron radiation, and
   4. separating hydrogen gas from said exposed materials.

2. A process for producing hydrogen by exposure of a water medium to neutrons which comprises:
   1. providing a water medium for exposure to neutron radiation,
   2. incorporating in said water medium an additive having a nuclei which, upon absorption of a neutron, will disintegrate releasing energy and leaving non-radioactive products,
   3. exposing said medium and incorporated additive to neutron radiation, and
   4. separating hydrogen gas from said exposed materials.

3. A process for producing hydrogen by exposure of a water medium to neutrons which comprises:
   1. providing a water medium for exposure to neutron radiation,
   2. incorporating an additive selected from boron, lithium and compounds thereof in said water medium,
   3. exposing said medium and incorporated additive to neutron radiation, and
   4. separating hydrogen gas from said exposed materials.

4. A process as defined in claim 3 in which said water medium comprises a water vapor.

5. A process as defined in claim 3 in which said water medium comprises a water spray.

6. A process as defined in claim 3 in which said water medium comprises a body of steam.

7. A process ad defined in claim 3 in which said additive comprises boric acid.

8. A process as defined in claim 3 in which said additive comprises a boron-containing particulate.

9. A process as defined in claim 3 in which said additive comprises a boron-containing particulate having a size such that the particles are below the mean free path of the radiation.

10. A process as defined in claim 3 in which said additive comprises a boron-containing particulate of a size that over 25% of the radiation escapes the particle.

11. A process as defined in claim 3 in which said hydrogen gas is separated from the exposed medium by diffusion through a porous membrane.

12. A process as defined in claim 3 in which said membrane is selected from a solid material permeable to hydrogen.

13. A process as defined in claim 3 in which said membrane is selected from palladium, iron, niobium, stainless steel, nickel, steels and glasses of high $SiO_2$, $B_2O_3$ or $P_2O_5$ content.

* * * * *